May 28, 1957 G. BAFFI 2,793,624
DRY GAS METER WITH ROTARY GAS DISTRIBUTOR
Filed Sept. 2, 1954 6 Sheets-Sheet 1

INVENTOR
GIUSEPPE BAFFI
BY
ATTORNEYS

May 28, 1957  G. BAFFI  2,793,624
DRY GAS METER WITH ROTARY GAS DISTRIBUTOR
Filed Sept. 2, 1954  6 Sheets-Sheet 3

INVENTOR
GIUSEPPE BAFFI
BY Toulmin & Toulmin
ATTORNEYS

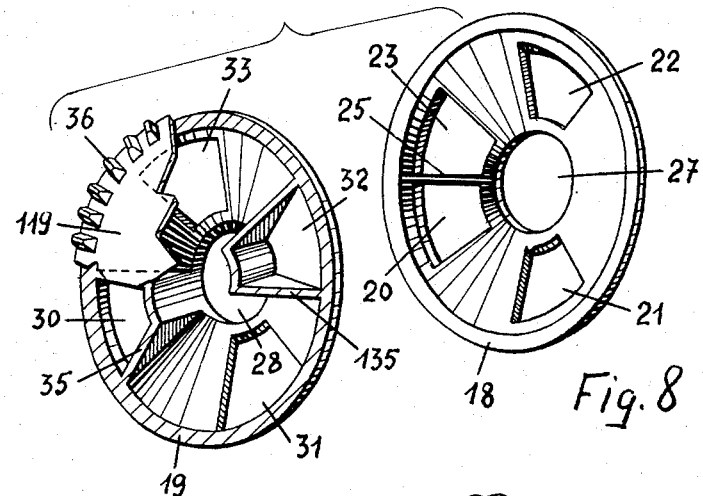
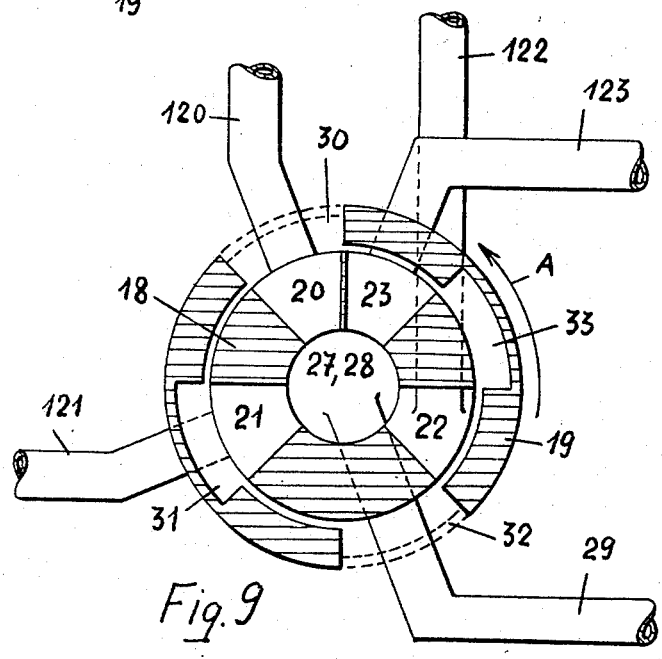

May 28, 1957 G. BAFFI 2,793,624
DRY GAS METER WITH ROTARY GAS DISTRIBUTOR
Filed Sept. 2, 1954 6 Sheets-Sheet 5

INVENTOR
GIUSEPPE BAFFI
BY Toulmin & Toulmin
ATTORNEYS

May 28, 1957  G. BAFFI  2,793,624
DRY GAS METER WITH ROTARY GAS DISTRIBUTOR
Filed Sept. 2, 1954  6 Sheets-Sheet 6
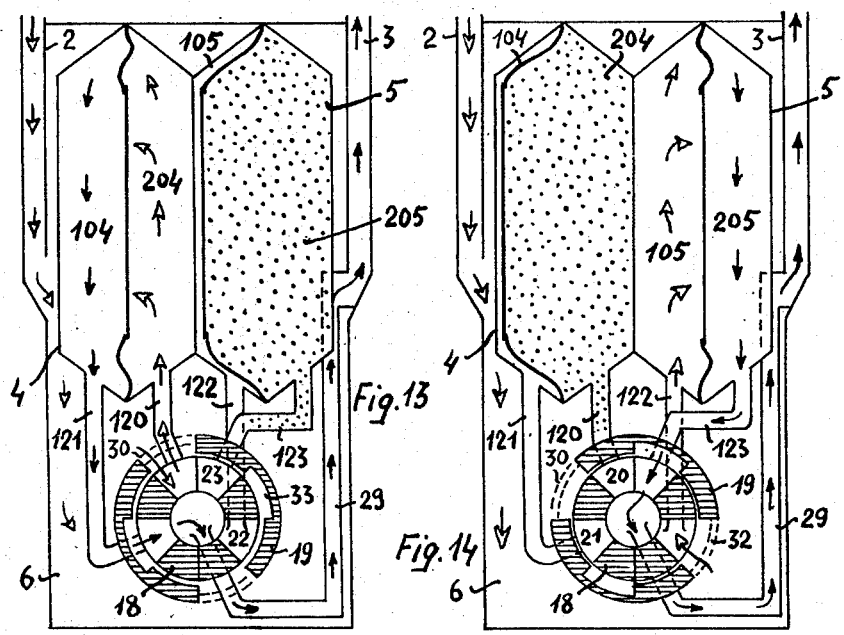
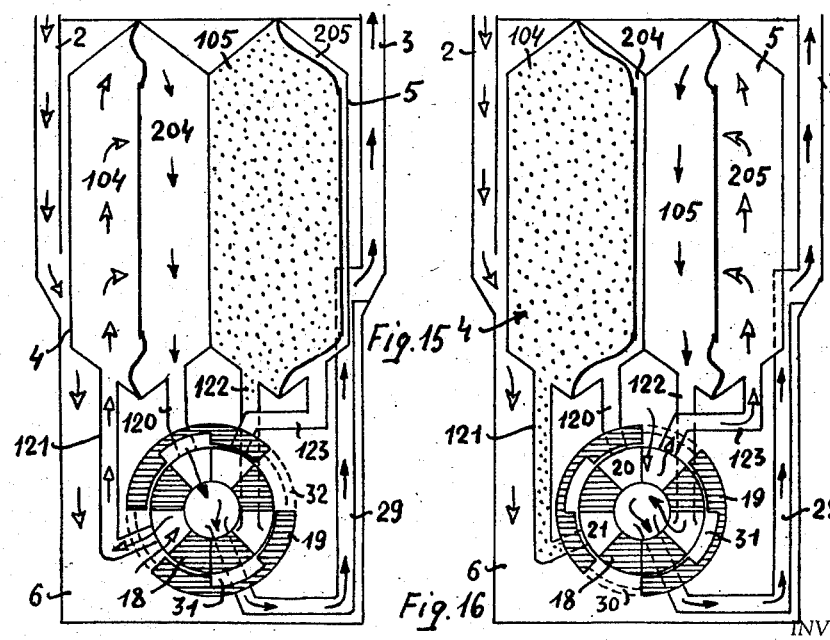
INVENTOR
GIUSEPPE BAFFI
BY
ATTORNEYS

United States Patent Office 2,793,624
Patented May 28, 1957

2,793,624

DRY GAS METER WITH ROTARY GAS DISTRIBUTOR

Giuseppe Baffi, Genoa, Italy, assignor to Vivaldi and Company, Genoa, Italy

Application September 2, 1954, Serial No. 453,919

Claims priority, application Italy September 12, 1953

9 Claims. (Cl. 121—179)

The present invention relates to the dry gas meters and particularly to domestic and industrial meters of town gas, methane and the like.

The main object of the invention is to replace, in the dry gas meters, the usual heavy reciprocating distributing slides with relatively light rotary distributors, which rotate continuously, thus considerably reducing the gas pressure losses within the meter.

Another object of the invention is to provide a dry gas meter which is particularly adapted to work with a rotary distributor.

Still another object of the invention is to provide an improved dry gas meter of the kind above-referred to, in which the most part of the liquid and solid impurities entrained by the gas are deposited in a gas decanting chamber before passing through and by the movable members of the meter.

The improved rotary distributor according to the invention is in the form of a multi-way rotary distributing valve, made preferably of conical or cup shape and is fitted preferably below the usual bellows-like measuring chambers and above said decanting chamber with which it is in communication through at least one opening, while the gas inlet opens in said decanting chambers, whereby the gas is caused to pass through a tortuous path with at least one inversion of the direction of flow, thus promoting the separation of the liquid and solid particles entrained thereby and to permit at the same time the return by gravity into the decanting chamber of the impurities deposited into the same distributing valve.

The above and other features and advantages of the invention will become apparent from the following description of some preferred embodiments, shown by way of non-limiting example in the attached drawings, in which:

Fig. 8 is a perspective view with parts broken away, of the seat and rotary shutter of the distributing valve shown in the preceding figures and which, when fitted on the gas meter as shown, effects one complete distributing cycle in ½ revolution of the shutter.

Fig. 9 is a demonstrating diagram of the distributing valve shown in the preceding figures.

Figs. 13 to 16 show diagrammatically the single phases of the working of the meter during a complete measuring cycle.

Figure 1:
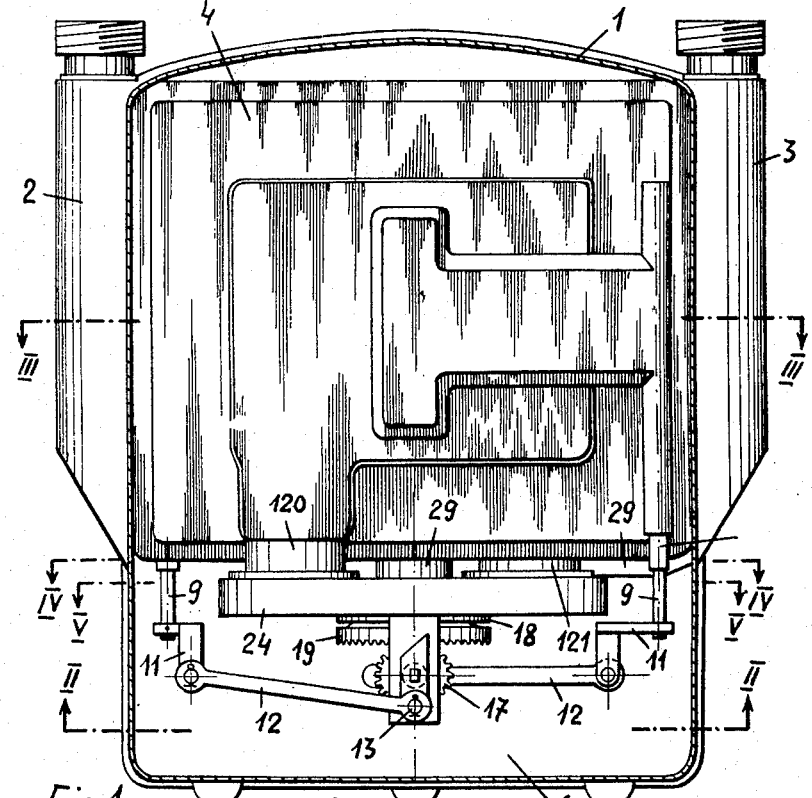
Fig. 1 is a front elevation of a gas meter according to the invention, with the front wall of its housing broken away.

With reference to Figures 1 to 5, 1 indicates the tight meter housing while 2 and 3 indicate the gas inlet and outlet. In the upper part of housing 1 the conventional "double bellows" or gas-tight measuring chambers 4 and 5 are fitted while below them, in the lower part of the housing 1 a decanting chamber 6 is provided into which the gas inlet 2 opens, from which the gas flows downwardly. Each measuring chamber 4, 5 is divided into two tight compartments by a movable and/or deformable partition which in the example as shown is constituted by a flexible skin 7 to the centre of which a pair of stiffening plates 107 are attached. Each partition 7 may be brought alternatively in known manner towards either of the two opposite walls of the respective measuring chambers 4, 5. The two partitions 7 are driven in said directions and in phase opposition for each measuring chamber by the same gas pressure which is introduced in suitable manner into the compartments of the measuring chambers 4, 5, alternatively to either side of the respective partition 7 by means of a rotary distributing valve controlled by the movement of the same partitions 7. This arrangement substantially corresponds to that of the conventional "double bellows" of usual dry gas meters. To one of the plates 107 of each leather partition 7 a lever arm 8 is hinged by one of its ends, while the opposite end is fastened to a small vertical rotatable shaft 9. Shafts 9 pass through stuffing boxes 10 out of their respective measuring chambers 4, 5 and into the underlying decanting chamber 6 where they are operatively connected through lever arms 11 and connecting rods 12 to two opposite cranks 13 carried by shaft 14. The whole is so designed that the reciprocation, which is opposite as to phase, of said partitions 7 and attached plates 107 promotes a rocking of shafts 9 and eventually, through swinging levers 11 and connecting rods 12, promotes the uniform and continuous revolution of shaft 14 in the direction of the arrow, while a ratchet tooth 117 fastened to shaft 14 and co-acting with a pawl 15 prevents rotation of shaft 14 in reverse direction. Shaft 14 drives the gearing of the recording mechanism 16 and, through pinion 17, meshing with a toothed crown 36 fastened to the rotary shutter 19 of the distributing valve drives continuously this latter and thus controls the filling and exhausting of the compartments of the measuring chambers 4, 5. In the embodiment as shown the ratio of the teeth of pinion 17 to crown 36 is 1:2.

In the embodiment shown in Figures 1 to 7 the rotary distributing valve is supported by a shallow box 24 from which the said toothed crown 36 carried by the bottom of the rotary valve shutter 19 projects. This shutter 19 forms the lower member of said distributing valve. The box 24 is fitted in the lower or decanting chamber 6, below the measuring chambers 4, 5 and will be particularly described in connection with the embodiment of rotary valve which has been particularly shown in Figures 6 to 8 and which is designed for the most usual case, in which the ratio of pinion 17 to toothed crown 36 is 1:2, viz. in the case in which one working cycle of the meter is completed in ½ revolution of the valve shutter 19.

In its preferred embodiment the valve comprises an open ended frusto-conical or cup-shaped seat 18 which is fastened to box 24 as will be seen hereinafter and a cup-shaped rotary shutter 19 tightly fitting within said seat 18.

Figure 2:
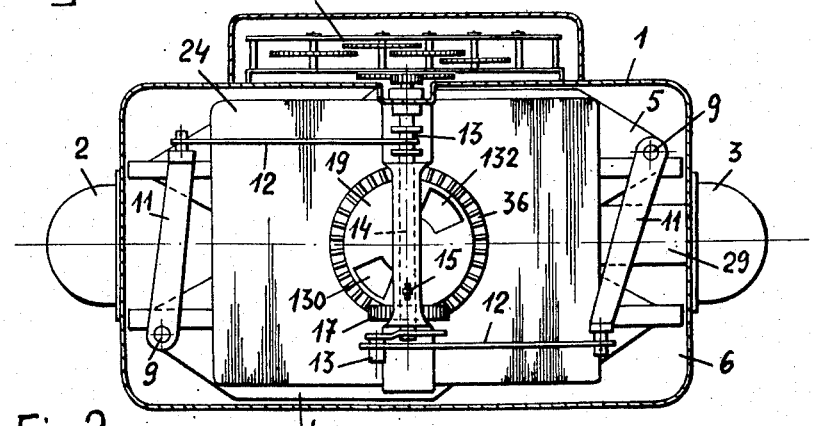
Figs. 2, 3, 4 and 5 are sections on lines II—II, III—III, IV—IV and V—V of Fig. 1 respectively.
Figure 3:
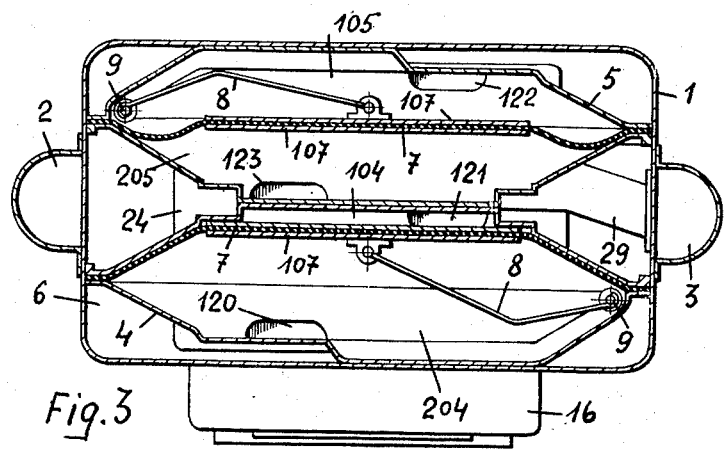
Figure 4:
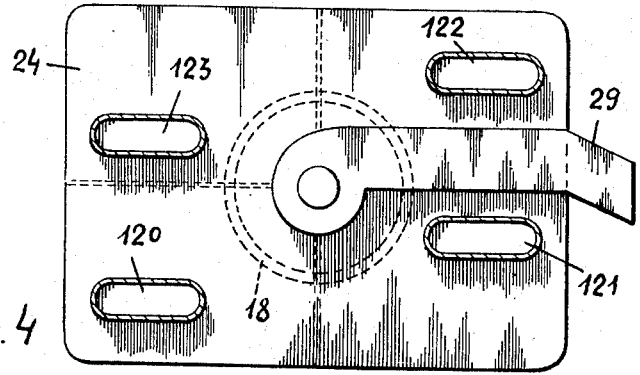
Figure 6:
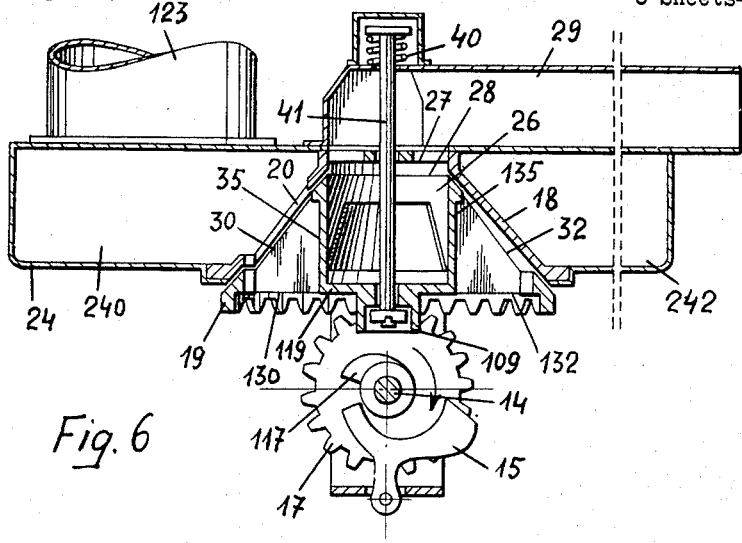
Figs. 6 and 7 are sections, through a distributing valve, on lines VI—VI and VII—VII of Fig. 4.
Figure 7:
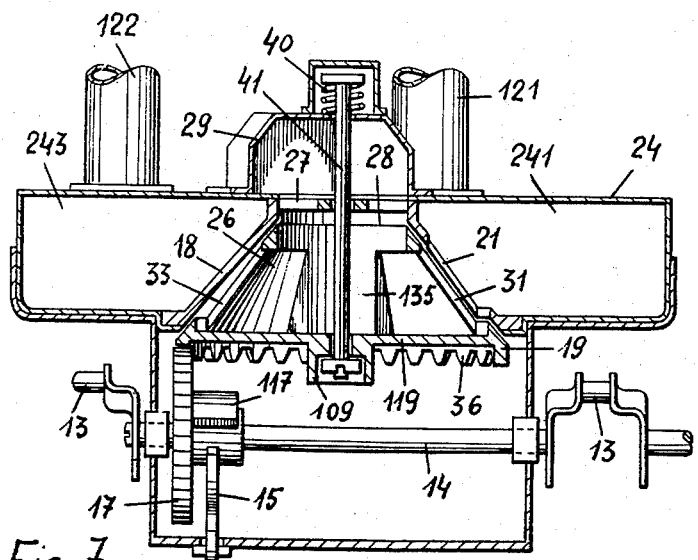

The valve shutter 19 is hollow, frusto-conical or cup-shaped and closed at its bottom by a plate 119 provided with a perforated hub 109, Figs. 6 and 7, and with two gas inlet ports 130 and 132, Fig. 2. The conical shell of shutter 19 has four sector-shaped ports 30, 31, 32, 33 each extending for about 45° and spaced by about the same angle from the next ports. The diametrically opposite ports 30, 32 are connected by means of short ducts 35, 135 to ports 130, 132 respectively, while the other diametrically opposite ports open to the interior of valve shutter 19 and are in communication with the open end 28 thereof.

The valve seat 18 is also provided with four sector-shaped ports 20, 21, 22, 23 extending each for about 45°, but two of these ports 20, 23 are close to one another and separated by a thin partition 25, while the other two ports 21 and 22 are spaced by 135° between them and by 45° from the next-lying ports 20, 23.

Figure 5:
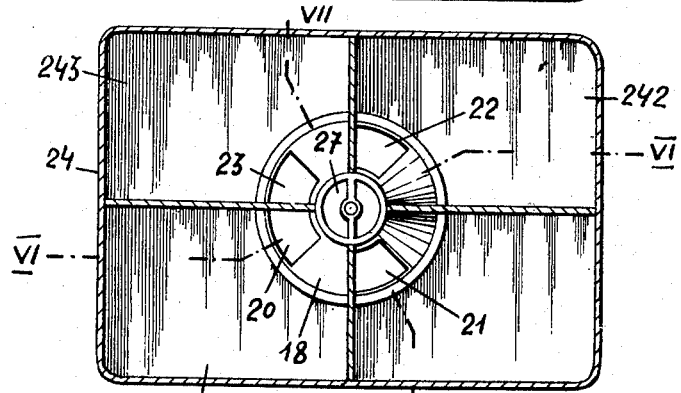

Said valve seat 18 is fastened to the entire centre of said shallow box 24 which is divided by partitions into four tight chambers 240, 241, 242, 243, Fig. 5, each provided with port 120, 121, 122, 123 each connected by a duct (diagrammatically shown in Figures 13 to 16, in which the ducts bear the same reference numeral as said last-named ports) to a compartment 204, 104, 105, 205 respectively of the measuring chambers 4, 5.

The central top opening 27 of the valve seat is in communication with the interior of the valve shutter 19 through a central top opening 28 of the latter and is connected by means of duct 29 fastened to the centre of box 24 to the gas meter outlet 3 (see also Figures 13 to 16).

The valve shutter 19 is tightly but rotatably held against its seat 18 by a bolt 41 passed through the central hole of hub 109 and pulled against said seat by a spring 40 bearing against a part of duct 29 fastened to box 24.

The cycle of the above described meter and distributing valve will be now described, whereby, in order to permit a diagrammatical showing of the position of the valve parts in the plane of the drawing, the showing of Fig. 9 has been adopted in which the valve 18 and the rotary shutter 19 has been shown in the form of concentrical circular crowns, whereby the gas inlet ports 30 and 32 of the shutter have been shown in the form of slots and the gas exhaust ports 31 and 33 have been shown in the form of grooves.

Referring now to Figures 13 to 16 assume to start from the valve position shown in Figures 9 and 13, one cycle of the meter will be completed in the following four steps:

1st step (Fig. 13): The valve shutter ports 30 and 31 are in register with the seat parts 20, 21. The gas continuously flowing into chamber 6 through inlet 2 fills the right-hand compartments 204 of chamber 4 by passing through ports 30, 20 and duct 120 and pushes the partition 7 to the left, thus pressing the gas contained in the left-hand compartment 104 out through duct 121 and ports 21, 31, leading into the interior of the valve shutter 19 and then through the top central ports 27, 28 and duct 29 is led to the meter outlet 3. The right-hand compartment 205 of the measuring chamber 5 is filled with gas but the ducts 122 and 123 which open into said chamber are closed by the valve shutter 19.

2nd step (Fig. 14): When the shutter rotates in the direction of the arrow A (Fig. 9), ports 22 and 23 of the seat come into register with ports 32 and 33 of the shutter and ports 20 and 21 are gradually closed. Thus the gas from chamber 6 flows through ports 22, 32 and duct 122 into the left-hand compartment 105 of chamber 5, and the gas from the right-hand compartment 205 is exhausted through duct 123, ports 23 and 33, chamber 26 and duct 29 to the gas meter outlet 3. This step is completed after ⅛ of revolution of valve shutter 19.

3rd step (Fig. 15): During the subsequent rotation of the shutter 19 by ⅛ of revolution, the ports 20, 33 and 21, 30 come into register while ports 23 and 22 are again closed: chamber 5 is closed while the gas from chamber 6 through ports 21, 30 and duct 121 fills the left-hand compartment 104 of chamber 4 and causes the gas contained in the right-hand compartment 204 to be exhausted through duct 120, ports 20, 33 and 27, 28 and through duct 29 to the outlet 3.

4th step (Fig. 16): During the subsequent rotation of the shutter 19 by ⅛ of revolution, ports 22—31 and 23—32 come into register, while ports 20 and 21 are closed, thus intercepting the outlet of the gas-filled chamber 4. The gas from chamber 6 fills the right-hand compartment 205 of chamber 5 through ports 23, 32 and duct 123 and causes the gas contained in the left-hand space 105 to be exhausted through duct 122, ports 22, 31 and 27 and 28, duct 29 and the outlet 3.

By this last (fourth) ⅛ of revolution, of shutter 19, its position is exactly alike that shown in Fig. 13 and the working of the meter is completed.

Of course, the rotary distributing valve for dry gas meters according to the invention may be embodied in numerous other ways, provided the valve seat has a number of ports equal to the number of measuring compartments or "bellows" to which each of the ports is connected, and the rotary shutter has a number of ports adapted to come into register with the ports of the distributing valve, whereby one half of said ports communicate through ducts traversing the said shutter with the gas inlet and the other half communicate through the interior of said shutter with a central port registering with a like central port of the seat which is put in communication with the gas meter outlet.

Figure 10:
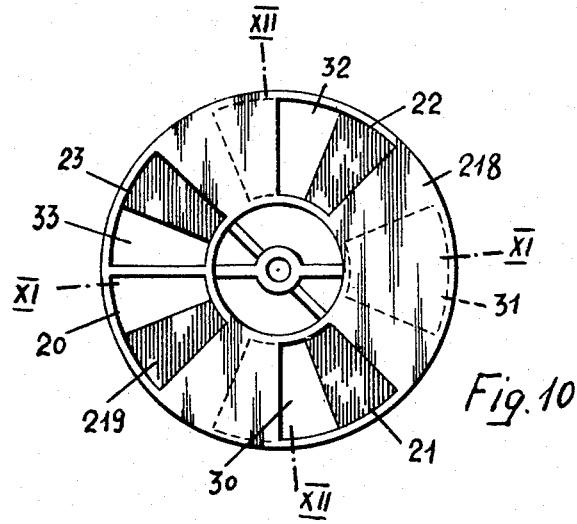
Fig. 10 is a plan view of another form of rotary distributing valve working like that shown in the preceding figures.
Figure 11:
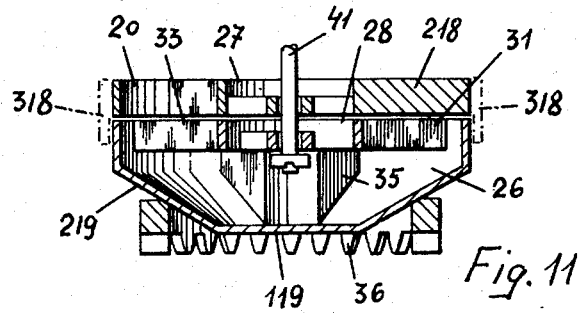
Figs. 11 and 12 are sections on lines XI—XI and XII—XII of Fig. 9.
Figure 12:
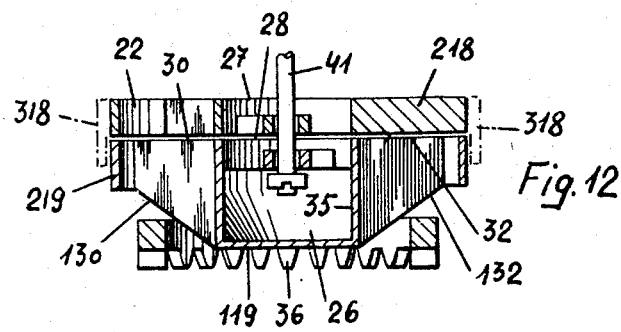

Another embodiment of such rotary distributing valve, in which both the co-acting surfaces of the seat and shutter are plane is shown in Figures 10 to 12, in which the valve seat is indicated by the reference numeral 218 and the shutter by 219. In order to provide a better guide to the rotation of the shutter and to improve the tightness of the valve, the seat may be provided with an annular flange 318.

As also this valve is designed for effecting the same distributing steps as the first embodiment in one half of a revolution of the shutter, the parts have been numbered like those of the first-described cup-shaped valve.

As it is apparent to the skilled in the art, the rotary distributing valves for gas dry meters according to the invention might be constructed also, following the same principles as just set out, for effecting a complete cycle even in one complete revolution of the shutter (in which case the ratio between the pinion 17 and the toothed crown 36 of the shutter must be 1:1) or also in any other fraction of shutter revolution and in these cases, while the construction of the shutter remains principally the same as outlined, the extension and arrangement of the various ports and ducts of the valve seat and shutter are accordingly varied.

Thus for example in the above case of a complete distributing cycle for each revolution of the shutter, the four valve seat ports must extend each for about 90° (the ports being separated by thin partitions), while the shutter must be provided with two diametrically opposite ports each extending for about 90° and one of which communicates through the shutter body with the gas inlet chamber while the other one communicates through a chamber formed within the shutter body (like the chamber 26 of the above-described embodiments) with the top central ports (like those 27 and 28 of the former embodiments) leading to the gas meter outlet.

Furthermore, although, in order to precipitate the non-gaseous particles from the gas it is preferred to arrange the rotary distributing valve in a chamber below the measuring chambers or bellows, it is possible to arrange said valve like the usual slide valves, above said measuring chambers, although by this arrangement, due also to the fact that the valve position must be reversed (viz. the shutter must be fitted above) the impurities would be precipitated also between the shutter and the seat, thus soiling the distributing valve.

I claim:

1. In a dry gas meter having a gas inlet leading into a gas-inlet chamber and a gas outlet and comprising the conventional arrangement of a number of pairs of bellows attached to rigid plates and driving, by their reciprocating movement by the alternate filling and exhausting of the bellows a rod and crank arrangement, the improvements comprising the arrangement of said gas inlet chamber below said bellows, a pinion disposed below said bellows and being actuated thereby; a rotary distributing valve assembly arranged in said gas inlet chamber below said bellows and comprising a fixed circular valve seat having a number of peripherally arranged ports corresponding to the number of bellows, each of said peripheral ports being connected to a bellows, and a central port connected to said gas outlet; a rotary shutter mounted in gas tight contact coaxially with said seat for rotation thereon and provided with an even number of angularly spaced ports, adapted to register in pairs with at least two of said peripheral ports of said valve seat; solid contacting surfaces on said shutter between said shutter ports for obstructing said seat ports when registering therewith, a central port in said shutter registering with said central seat port, and a circular toothed member fastened to said rotary shutter and operatively connected to said bellows-actuated pinion.

2. In a dry gas meter having a gas inlet leading into a gas-inlet chamber and a gas outlet and comprising the conventional arrangement of a number of pairs of bellows attached to rigid plates and driving, by their reciprocating movement by the alternate filling and exhausting of the bellows a rod and crank arrangement, the improvements comprising the arrangement of said gas inlet chamber below said bellows, a pinion disposed below said bellows and being actuated thereby; a rotary distributing valve assembly arranged in said gas inlet chamber below said bellows and comprising a fixed circular valve seat having a number of peripherally arranged ports corresponding to the number of bellows, each of said peripheral ports being connected to a bellows, and a central port connected to said gas outlet; a rotary shutter mounted in gastight contact coaxially with said seat for rotation thereon and provided with an even number of angularly spaced ports, adapted to register in pairs with at least two of said peripheral ports of said valve seat; solid contacting surfaces on said shutter between said shutter ports for obstructing said seat ports when registering therewith, said contacting surfaces of said valve seat and shutter being substantially frusto-conical.

3. A dry gas meter as described in claim 1, wherein said gas inlet chamber is a shallow box, said seat of said rotary distributing valve being disposed centrally therein, said shallow box being divided by partitions into a plurality of gastight chambers equal in number to the number of peripheral ports of said distributing valve, each of said box chambers having a port for registering with one of said peripheral valve ports; said improvements further comprising a central duct into which said central port of said valve seat opens; each of said peripheral chambers communicating with a bellows, and said central chamber communicating with said gas outlet of the meter, said rotary shutter of said distributing valve comprising a top section rotating in gastight contact with said valve seat and being provided with said even number of peripheral ports and with a central top port, and a bottom section carrying said circular toothed member and provided with ports leading to one half of said peripheral ports of said top section.

4. A dry gas meter according to claim 3, in which said contacting surfaces of said valve seat and shutter are substantially frusto-conical and are disposed with their common rotary axis vertically in relation to said meter.

5. A dry gas-meter according to claim 1, in which the contacting surfaces of the distributing valve seat and shutter are cup-shaped.

6. A dry gas meter according to claim 1, in which contacting surfaces of the distributing valve seat and shutter are plane.

7. A dry gas meter according to claim 1, in which the valve shutter is tightly pulled against its seat by means of a spring-retracted bolt member.

8. In a dry gas meter having a gas inlet and a gas outlet and provided with two double bellows which by their reciprocating movement consequent to their alternate filling and exhausting, drive through a crank and connecting rod arrangement a pinion fitted below said bellows, which is continuously rotated thereby in one direction, the improvements comprising a gas inlet chamber arranged below said bellows and connected to said gas inlet, a rotary distributing valve centrally disposed in said gas inlet chamber and comprising a seat having four peripheral ports each connected to a bellows, and a central port connected to the said gas outlet, said peripheral ports extending each for about 45° and two being fitted close together, while the other two are spaced by 45° from said two first-named ports and by 135° from each other; a rotary distributing member rotatably mounted in gas-tight contact co-axially with said seat and provided with four equally spaced peripheral ports, extending each for about 45°, shutter parts between said peripheral ports and a central outlet port, said peripheral ports being adapted by rotating to register with either of the peripheral ports of said seat, whereby said shutter parts are adapted to close said seat ports by being brought to register therewith; two diametrically opposite ports of said rotary distributing member being in communication with said gas inlet and the two other ports being in communication, through said central ports of said distributing member and seat, with said gas outlet; and a circular toothed crown attached to said distributing member and meshing with said bellows-driven pinion, the driving ratio of said pinion to said toothed crown being 2:1.

9. A dry gas meter according to claim 8, in which one of the bellows of a double bellows is connected to one of said two seat ports lying close together, while the other bellows of said double bellows is connected with one of said two spaced ports.

References Cited in the file of this patent
UNITED STATES PATENTS

| | | |
|---|---|---|
| 381,678 | Des Brisay | Apr. 24, 1888 |
| 806,541 | Hagspiel | Dec. 5, 1905 |
| 1,200,572 | Appell | Oct. 10, 1916 |
| 1,273,042 | De la Matyr | July 16, 1918 |
| 1,519,670 | Danstrup | Dec. 16, 1924 |
| 1,583,203 | Tolhurst | May 4, 1926 |